Feb. 10, 1925.
E. C. BELLINGER
TRACTOR
Filed May 9, 1923
1,526,199
2 Sheets-Sheet 1
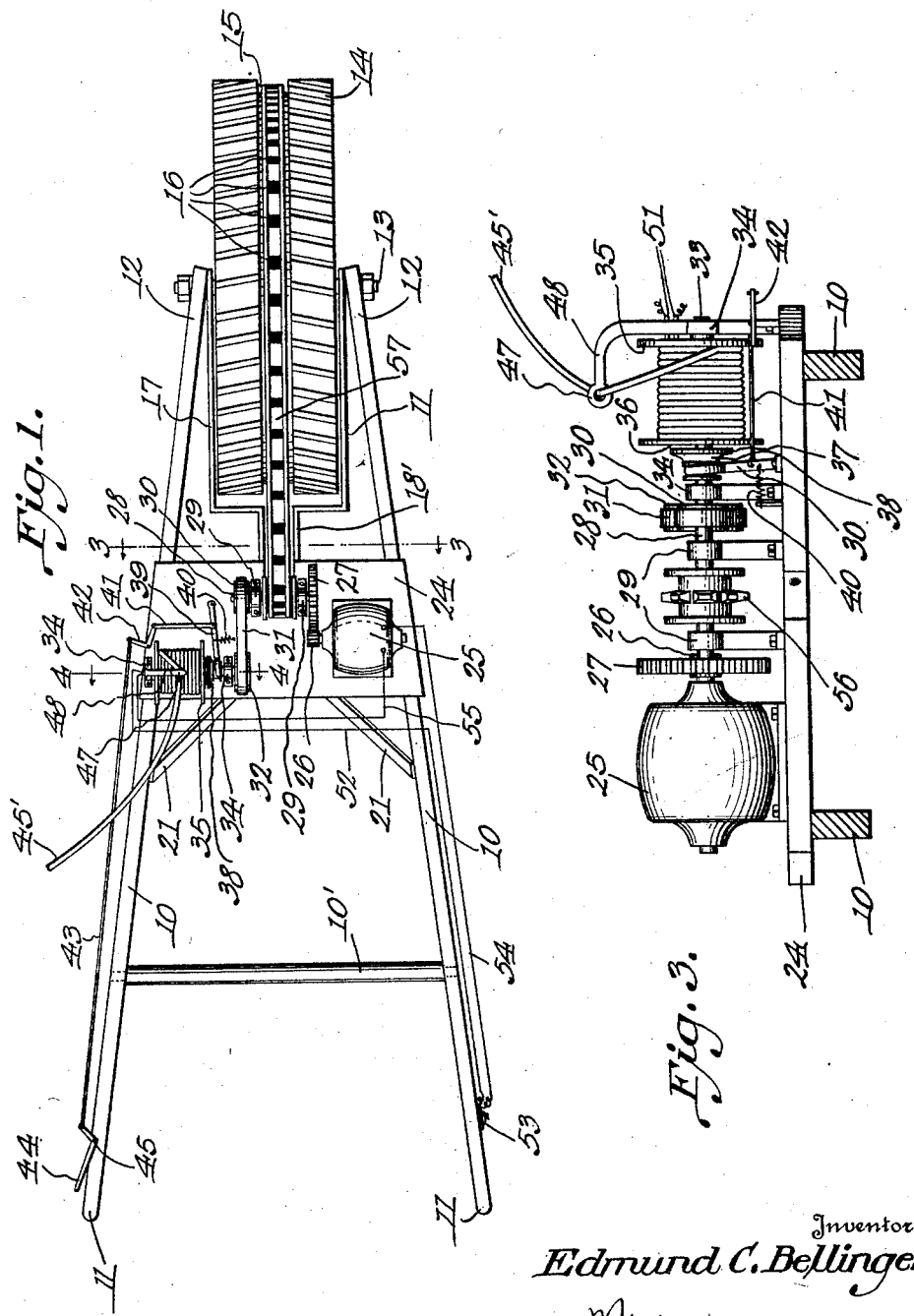
Inventor
Edmund C. Bellinger
Attorney Feb. 10, 1925.
E. C. BELLINGER
TRACTOR
Filed May 9, 1923
1,526,199
2 Sheets-Sheet 2
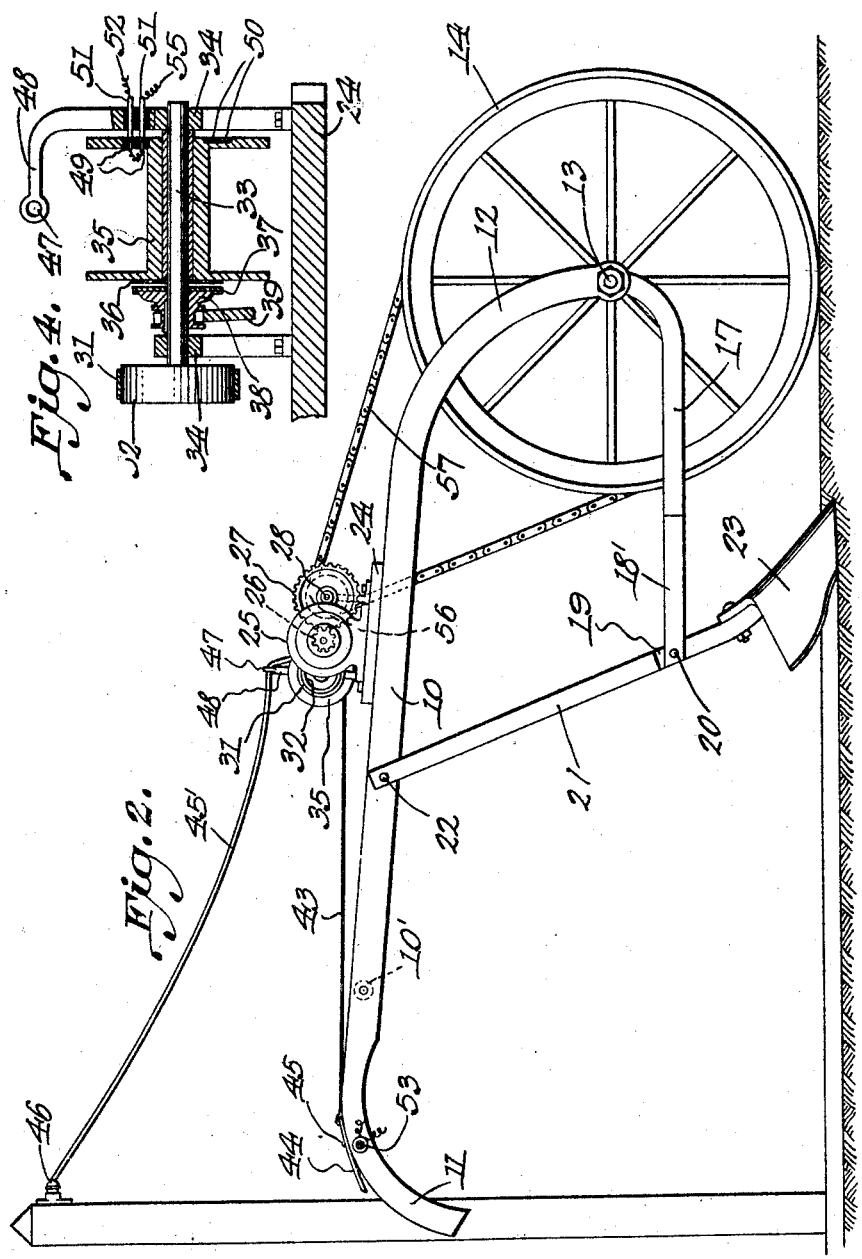
Inventor
Edmund C. Bellinger
By BM Mullman
Attorney Patented Feb. 10, 1925.

1,526,199

UNITED STATES PATENT OFFICE.

EDMUND C. BELLINGER, OF ATLANTA, GEORGIA.

TRACTOR.

Application filed May 9, 1923. Serial No. 637,720.

*To all whom it may concern:*

Be it known that I, EDMUND C. BELLINGER, a citizen of the United States, residing at Atlanta, in the county of Fulton and State of Georgia, have invented certain new and useful Improvements in Tractors, of which the following is a specification.

My invention relates to tractors.

An important object of the invention is to provide a tractor which is operated by an electric motor, and so constructed that it is adapted to be conveniently actuated by a single operator, grasping two handles at the rear of the tractor.

A further object of the invention is to provide a tractor of the above mentioned character, embodying a single wheel unit at its forward end, with a pair of handles projecting rearwardly from the wheel, and having the operating parts of the device properly distributed, so that their weight is balanced.

A further object of the invention is to provide a tractor of the above mentioned character adapted to produce a cheap and convenient source of power, operated by electricity supplied from the house lighting circuit, whereby small garden plots or backyard gardens, adjacent to the house, in cities or towns, may be readily cultivated.

A further object of the invention is to provide a tractor of the above mentioned character, having automatic means to wind and unwind the electric cable leading to the house.

Other objects and advantages of the invention will be apparent during the course of the following description.

In the accompanying drawings forming a part of this specification and in which like numerals are employed to designate like parts throughout the same, Figure 1 is a plan view of a tractor embodying my invention, Figure 2 is a side elevation of the same, Figure 3 is a transverse section taken on line 3—3 of Figure 1, and, Figure 4 is a transverse section taken on line 4—4 of Figure 1.

In the drawings, wherein for the purpose of illustration is shown a preferred embodiment of my invention, the numeral 10 designates a pair of longitudinal beams, converging forwardly, and provided at their rear ends with handles 11. The rear portions of these beams are connected by a transverse rod 10'. The beams 10, at their forward ends, are curved or extend downwardly, as indicated at 12, and have connection with a transverse axle 13, carrying a rotatable traction wheel 14. This traction wheel is preferably provided centrally thereof with an annular recess 15 and sprocket teeth 16 are formed upon the traction wheel, within this annular recess.

The numeral 17 designates a pair of draw bars, having their forward ends apertured for receiving therethrough the axle 13. These draw bars have inwardly offset longitudinal portions 18', which are preferably detachably connected with a stock 19, by means of a bolt 20 or the like. This stock embodies upwardly diverging upper portions 21, which may be detachably connected with the beams 10, by bolts 22 or the like. The numeral 23 designates a shear, secured to the stock 19. It is obvious that the invention is not necessarily restricted to its use as a cultivator, as any other implement may be secured to the draw bars 17, such as a lawn mower, rake or the like.

The numeral 24 designates a support or platform, which is rigidly mounted upon the beams 10, intermediate their ends, and preferably slightly nearer the forward ends thereof. Mounted upon this platform, near one end thereof, is an electric motor 25, having its armature shaft driving a gear 26. This gear 26 engages and drives a larger gear 27, rigidly mounted upon a transverse shaft 28. This transverse shaft extends longitudinally of the platform 24 and is disposed centrally thereof with respect to the ends of the platform. The shaft 28 is journaled in bearings 29, bolted to the platform, as shown. At its opposite end, the shaft 28 carries a pulley 30, rigidly secured thereto, engaged by a belt 31, extending rearwardly for engaging a pulley 32.

This pulley 32, see more particularly Figure 4, is rigidly mounted upon a shaft 33, journaled in bearings 34, which are bolted to the platform 24. Rotatable upon the shaft 33 is a spool or drum 35, one end of which is provided with a friction clutch face 36, rigidly secured thereto. The numeral 37 is a coacting friction clutch face, rigidly secured to a sliding clutch element 38, keyed upon the shaft 33, to move longitudinally thereof and turn therewith. The clutch element 38 is shifted by a swinging fork 39, moved in one direction by a retractile coil spring 40, and shifted in the opposite direction by a link 41. This link 41 is pivotally connected with a pivoted bell crank lever 42, turned by a link 43, extending longitudinally of the left hand beam 10, and pivoted with a bell crank lever 44, pivotally supported at 45. The longitudinal arm of this bell crank lever is arranged adjacent to the handle 11 to be conveniently gripped by the operator. Particular attention is called to the fact that the reel 35 and associated elements are arranged at the left end of the platform 24, and these elements substantially balance the weight of the motor 25, with the shaft 28 and associated elements in the central portion of the platform. This is advantageous inasmuch as it permits of the tractor being balanced, and hence conveniently manipulated by the user grasping the handles 11.

Current is supplied to the motor from a cable 45', which may lead to a plug 46, which may be secured to a post in the yard, or to the interior or exterior of the house, as desired. This cable is passed through an eye 47, carried by an overhanging arm 48, rigidly secured to the bearing 34. The eye 47 is preferably disposed centrally of the drum 35. The cable is wound upon the drum and one end of the cable is permanently connected with the drum. In order that the current may be properly taken off, the free ends of the wires of the cable are connected with binding posts 49, Figure 4, which have electrical connection with metallic rings 50, secured to the outer face of one end of the drum, and thoroughly insulated therefrom. These metallic rings are permanently engaged by stationary contacts 51, mounted upon the arm 48, and insulated therefrom. One contact 51 is connected with a wire 52, extending longitudinally of the right beam 10, and connected with a switch 53. A wire 54 leads from this switch to one terminal of the motor and a wire 55 leads from the opposite terminal and is connected with the other contact 51. The circuit is of course very simple, and when the switch 53 is closed, current will pass from one contact 51, through wire 52, switch 53, wire 54, motor 25, wire 55, and through the other contact 51, and of course through the wires of the cable 45' back to the source of current.

The shaft 28 is provided centrally thereof between the bearings 29 with a sprocket wheel 56, engaged by a forwardly extending sprocket chain 57, extending about the traction wheel 14 within the annular recess 15, and engaging the sprocket teeth 16.

The operation of the tractor is as follows:

The operator stands at the rear of the tractor and holds the handles 11 in his hand. The spring 40 normally retains the clutch head 38 in the inactive position. The switch or button 53 being now pressed, the motor will start and the tractor may be driven away from the socket 46. As the reel or spool 35 is free to turn, it will pay out the cable. When the end of the row is reached, the tractor may be turned around, and the tractor made to travel toward the socket. In order that the cable will not be in the way, it is rewound upon the drum. To accomplish this, the lever 44 is gripped toward the handle, and the clutch head 38 shifted toward the drum whereby the friction clutch faces 36 and 37 engage. The drum is therefore rotated for winding up the cable, and this rotation may be instantly stopped, and the drum again rendered free to rotate, by releasing the lever 44. By virtue of the friction clutch associated with the drum, any undue pull upon the cable in winding, is prevented.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A tractor of the character described comprising, a traction wheel, longitudinal beams disposed upon opposite sides of the traction wheel and pivotally connected therewith and provided at their rear ends with handles, a support extending transversely of the longitudinal beams between their ends and rearwardly of the traction wheel and connected therewith, a motor mounted upon the support near one end thereof, a reel mounted upon the support near the opposite end thereof, gearing mounted upon the support between the motor and reel, driving connecting means between the gearing and the traction wheel, driving connecting means between the gearing and the reel, and driving connecting means between the gearing and the motor.

2. A tractor of the character described comprising, a traction wheel, longitudinal beams disposed upon opposite sides of the traction wheel and pivotally connected therewith and provided at their rear ends with handles, a support extending transversely of the longitudinal beams between their ends and rearwardly of the traction wheel and connected with such means, a motor mounted upon the support near one end thereof, a reel mounted upon the support near its opposite end for carrying a cable supplying current to the motor, a driving shaft mounted upon the support near its center, gearing between the motor and the driving shaft, gearing between the driving shaft and the traction wheel, a clutch device associated with the reel, gearing between the clutch device and the driving shaft, and manually operated means to render the clutch device active and inactive.

3. A tractor of the character described comprising, a traction wheel unit, a frame pivotally connected with the traction wheel unit and provided at its rear ends with handles, an electric motor mounted upon the frame, gearing mounted upon the frame and driven by the motor, driving connecting means between the gearing and the traction wheel unit, a reel rotatably mounted upon the frame, driving connecting means between the reel and the gearing embodying a clutch device, a manually operated element arranged near one handle for rendering the clutch device active and inactive, a cable adapted to be wound and unwound upon the reel and having electrical connection with the motor, and a switch arranged near the other handle for controlling the opening and closing of the motor circuit.

4. A tractor of the character described comprising, a traction wheel unit, a frame supported at its forward end by the traction wheel unit and provided at its rear end with handles which are adapted to be engaged by the operator for supporting and guiding the frame, an electric motor mounted upon the frame, driving connecting means between the motor and the traction wheel unit, a reel rotatably mounted upon the frame, driving connecting means between the reel and the motor, a manually operated element arranged near one handle and serving to render the last named driving means active and inactive, a cable adapted to be wound upon the reel and having electrical connection with the motor, and a switch arranged near the other handle for controlling the motor circuit.

5. A tractor of the character described comprising a traction wheel, a frame having its forward end supported by the traction wheel and its rear end provided with handles adapted to be held by the operator in supporting and guiding the frame, gearing mounted upon the frame near its central longitudinal axis, a motor mounted upon the frame to drive the gearing, a reel mounted upon the frame and driven by the motor and adapted for receiving thereon a cable to supply current to the motor, and teeth formed upon the periphery of the traction wheel and driven by said gearing.

6. A tractor of the character described comprising, a frame, a traction wheel secured to the frame and provided in the central portion of its periphery with a set of sprocket teeth, a transverse driving shaft mounted on the frame, a sprocket wheel mounted upon the driving shaft at the longitudinal axis of the frame, a sprocket chain engaging the sprocket wheel and the sprocket teeth, a motor mounted upon the frame near one side thereof and geared to the shaft, a reel mounted upon the frame near the opposite side thereof and geared to the shaft, and a cable wound upon the reel and having electrical connection with the motor.

7. A tractor of the character described comprising, a traction wheel, a frame supported at its forward end by the traction wheel and provided at its rear end with handles adapted to be held by the operator in the supporting and guiding of the frame, gearing arranged near the central longitudinal axis of the frame and serving to drive the traction wheel, a motor mounted upon the frame upon one side of said central longitudinal axis and driving the gearing, and a reel mounted upon the frame upon the opposite side of said central longitudinal axis and adapted to receive thereon a cable for supplying current to the motor.

In testimony whereof I affix my signature.

EDMUND C. BELLINGER.